UNITED STATES PATENT OFFICE.

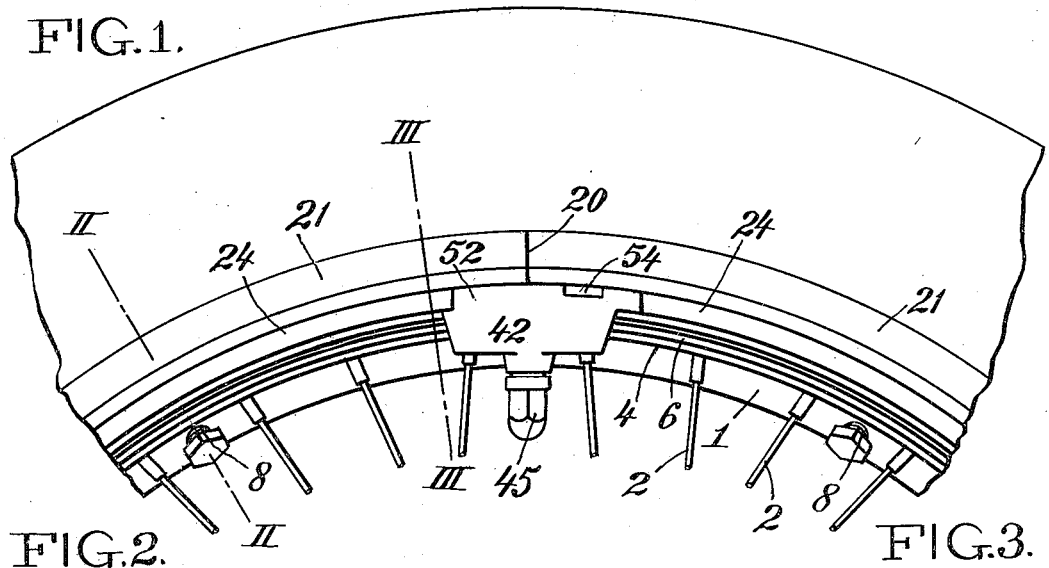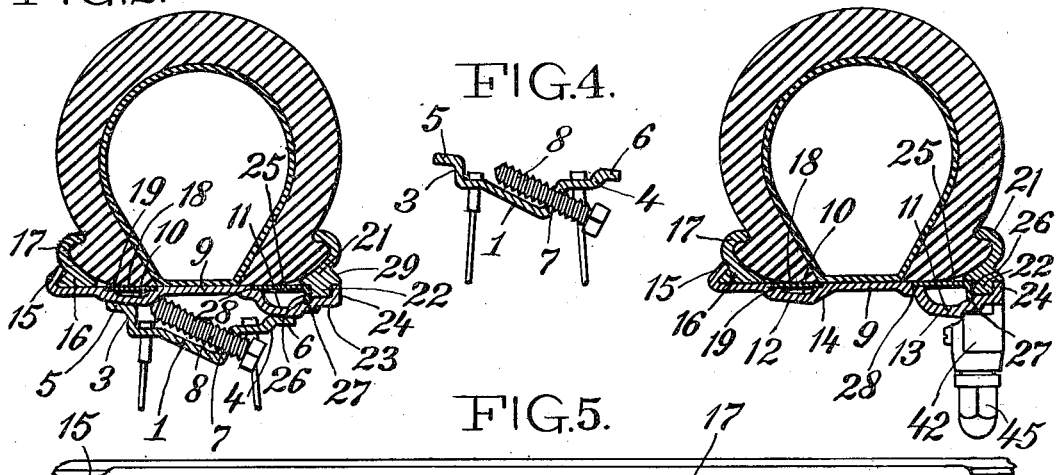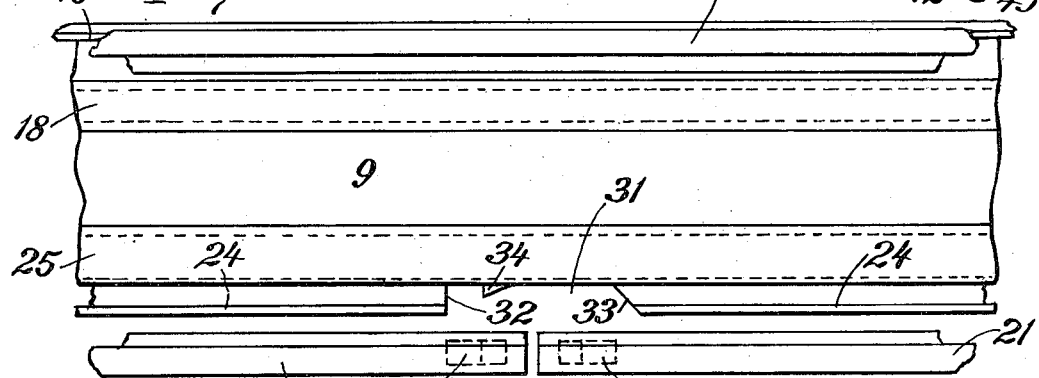

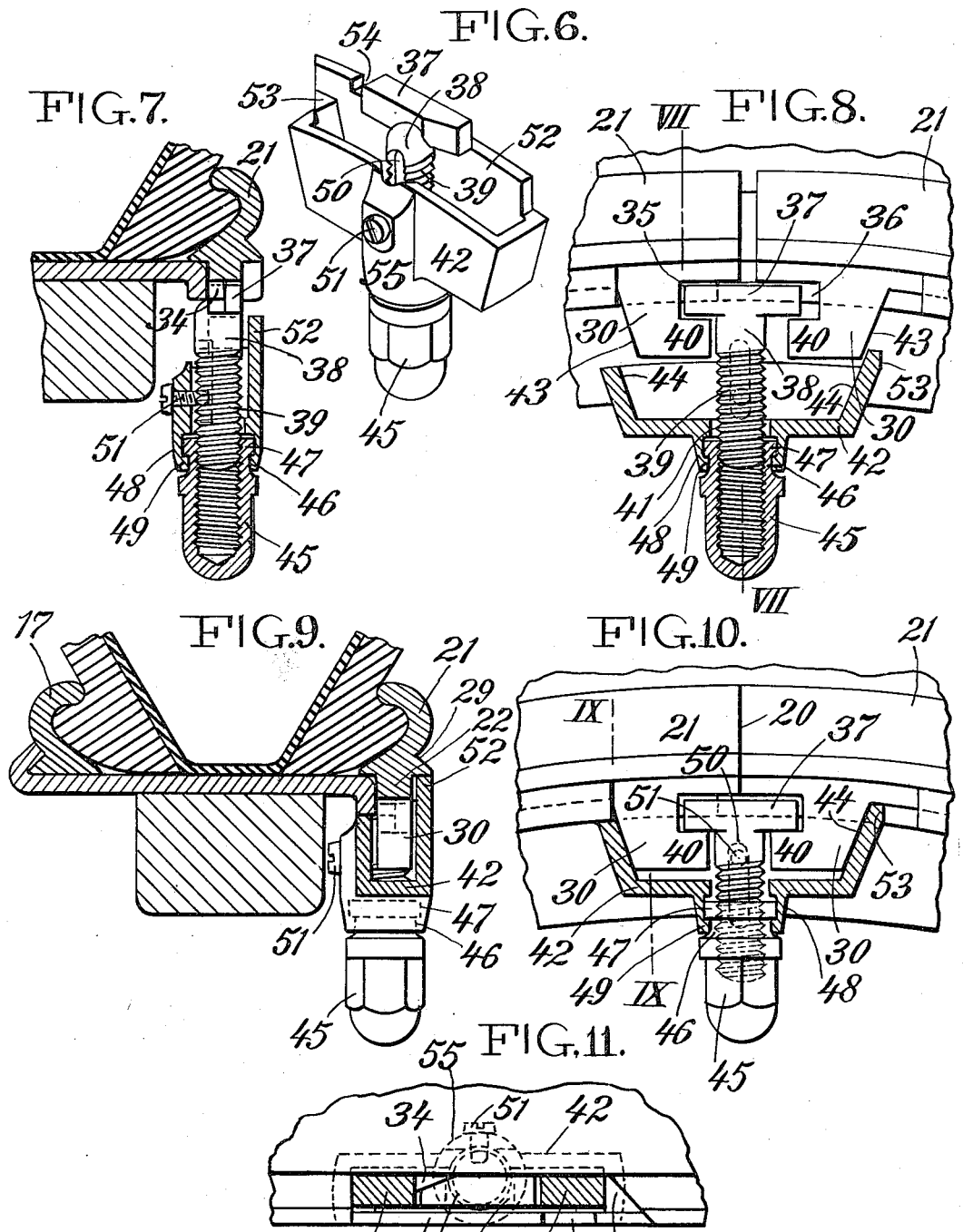

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,160,221.  Specification of Letters Patent.  Patented Nov. 16, 1915.

Application filed April 22, 1912. Serial No. 692,256.

*To all whom it may concern:*

Be it known that I, JAMES H. WAGENHORST, a citizen of the United States, residing at Akron, county of Summit, and State of Ohio, have invented certain new and useful Improvements in Vehicle Wheel-Rims, of which the following is a specification.

This invention relates to rims for holding pneumatic or other resilient tires. In one type of rims of this class it is a practice to make one of the tire-retaining flanges removable so as to facilitate the application and removal of the tire, and particularly so as to permit the use of "quick-detachable" tires; that is, tires provided with inextensible beads, and requiring no security bolts to hold them in place. The patent to Bryant, No. 912,537, dated February 16, 1909, shows an example of a rim of this kind in which the removable flange is transversely split and provided with lugs at its ends, passing through a slot in the rim base, locking devices being provided for securing these lugs in position and retaining the flange upon the rim base.

One of the objects of my present invention is to provide an improved form of the locking device shown in this patent, all of the parts making up the locking devices or locking clamp being permanently secured together so that they may be removed and replaced as a unit without danger of any of the parts being lost.

Another object of my invention is to provide an improved demountable rim structure in which the rim carrying the tire is capable of being mounted upon a wheel felly or fixed rim and firmly secured thereto and of being quickly removed from the wheel and replaced by a duplicate rim carrying another tire. The specific improvement shown is particularly applicable to the securing of rims upon wire wheels.

Other objects of my invention will appear from the following description thereof.

In the accompanying drawings, which form a part of this specification, Figure 1 is a side elevation of a portion of a wire wheel showing my improved rim applied thereto, and a portion of a tire carried by the rim. Fig. 2 is a transverse section through the tire, rim and felly member or fixed rim, on the line II—II of Fig. 1. Fig. 3 is a transverse section through the tire and rim, removed from the felly member, the position of the section being indicated by the line III—III of Fig. 1. Fig. 4 is a transverse section through the fixed rim or felly member with the tire and tire-carrying rim removed, and showing one of the attaching screws withdrawn to inoperative position. Fig. 5 is a plan view of a portion of the tire-carrying rim showing the split detachable flange removed from its seat and the locking clamp also removed. Fig. 6 is a perspective view of the locking clamp. Fig. 7 is a transverse section through the locking clamp, showing the same engaged with the lugs on the ends of the split flange preparatory to screwing up the clamp. This figure also shows the tire-retaining flange, and a portion of the rim base and tire in section, the rim base being shown as permanently mounted upon a wooden wheel felly. The section of Fig. 7 is taken on line VII—VII of Fig. 8. Fig. 8 is a side elevation of the parts shown in Fig. 7, the cap member and nut being shown in vertical section. Figs. 9 and 10 are views similar to Figs. 7 and 8, respectively, showing the nut screwed up and the cap member engaging the lugs on the ends of the split flange. Fig. 11 is a plan view of a portion of the rim base and of the locking clamp, the split flange being removed and its lugs being shown in section engaged by the clamp.

Referring to the drawings in detail, the numeral 1 designates the felly member or fixed rim of a vehicle wheel provided with wire spokes 2. As shown in Figs. 2 and 4, the felly member is in the form of a rolled sheet metal channel, having flanges at each edge thereof, the flange 3 at one edge being preferably higher than the flange 4 at the other edge. These flanges are preferably bent over to form beveled bearing surfaces 5 and 6 for engagement with the tire-carrying rim. An angular offset is preferably rolled in the bottom of the channel, the steeper wall 7 of this offset being perforated at intervals by screw-threaded holes through which screw the screws 8 which are used to secure the tire-carrying rim on the felly member or fixed rim.

The tire-carrying rim to be used upon this felly member may be of any suitable construction, provided with seats adapted to engage the beveled surfaces 5 and 6 of the felly member, and having some form of abutment against which the ends of the screws 8 may press to secure the rim upon the felly member. The tire-carrying rim is preferably, but not necessarily provided with a removable tire retaining flange which may be secured in position in any suitable manner, as for example by means of the improved locking clamp illustrated. As shown in Figs. 1, 2, 3 and 5, the tire-carrying rim comprises a rim base 9 having depressed portions 10 and 11 rolled therein, preferably without thickening the metal of the rim base, so that the rim may be formed cold from flat stock. The inner surfaces of the depressed portions of the rim form inclined bearing surfaces 12 and 13, which engage the inclined bearing surfaces 5 and 6, respectively. The wall 14 of the depressed portion 10 of the rim, forms an abutment against which the ends of the screws 8 press, the screws 8 thus serving to wedge the rim in position upon the felly member or fixed rim and retain it in such position. Fig. 2 shows one of the screws 8 in operative position, while Fig. 4 shows the screw withdrawn. It will be seen that, owing to the inclination of the screws, by unscrewing them a few turns into the position shown in Fig. 4, the ends of the screws will be withdrawn below the level of the supporting surfaces of the felly member, and thus permit the tire-carrying rim to be removed from the wheel. The screws 8 are preferably given a comparatively steep inclination so that they will not have to be withdrawn very far before clearing the rim. If this inclination is sufficiently great, particularly if the inclination of the screws is greater than that of the bearing surfaces of the fixed rim or felly band, the screws will not only force the rim laterally upon the wheel, thus causing the inclined surfaces 12 and 13 to wedge upon the inclined surfaces 5 and 6, but the screws may also tend to lift the rim slightly, thus forcing it away from the surfaces 5 and 6. Such action is in no way objectionable, but rather advantageous, as the lifting of the rim opposite the screws will cause it to be drawn into tight clamping contact with the surfaces 5 and 6 throughout the space between adjacent screws. A very secure mounting of the rim upon the vehicle wheel is thus obtained.

It will be seen that the heads of the screws are very conveniently positioned, and that the screws may be operated by a brace wrench, such as is commonly used for operating demountable rims. The formation of the felly band or fixed rim with the circumferential angular offset provides a construction very easy to manufacture, adding practically nothing to the cost of the wheel. It at the same time provides excellent bearings for the screws 8 and makes a wheel of very attractive appearance.

The rim base 9 beyond the depression 10 is formed into a flange 15 which is preferably inwardly hooked as shown, so as to engage the base 16 of a reversible endless tire-retaining flange 17. The particular construction of this tire-retaining flange is not, however, a part of the present invention, it being claimed in my application filed July 22, 1911, Serial Number 639,953, and the rim base may be provided with an integral, or any other form of tire-retaining flange desired. In order to provide the rim with a flush tire-seating surface, the depression 10 may be covered by a band 18, which is preferably formed of an endless strip of metal, shrunk into shallow recesses 19 formed at the sides of the depression 10 to receive the edges of the band.

As above stated, the rim is preferably provided with a removable tire-retaining flange, this flange in the form of my invention illustrated, being transversely split at the point 20. This flange, which is designated by the numeral 21, is provided with a base 22 which is received in a channel in the rim. This channel is preferably formed by carrying the rim base beyond the depression 11 to provide a cylindrical seat 23 and a vertical retaining flange 24. In order to cover the depression 11 and provide a smooth seating surface for the tire, a band 25 is used, this band having a vertical leg 26 which seats in a recess 27 formed by offsetting the rim base, the side of this vertical leg 26 completing the channel for the reception of the base 22 of the flange 21. The band 25 is preferably shrunk into position in the same way as the band 18, the edge of the cylindrical portion of the band being received in the shallow recess 28.

The flange 21 is reversible and may be of practically the same construction as the split tire-retaining flange shown in the patent to Bryant above referred to. I prefer, however, to form in that side of the flange designed to engage a straight-sided tire, an annular groove 29. I have found that the formation of such a groove in this face of the flange in no way interferes with the satisfactory retaining of a straight-sided tire, while the amount of metal removed by the formation of such a groove is sufficient to result in a material reduction in weight of the rim. The flange 21 is provided at its ends with lugs 30 which project through a slot 31 cut in the channel portion of the rim, such slot being clearly illustrated in Fig. 5. It preferably has one end wall, 32, formed at right angles to the edge of the rim, the other end wall 33 being inclined or beveled.

In applying the flange to the rim, one of the lugs 30 is placed against the wall 32 and the base 22 of the flange pressed into the channel, the beveled wall 33 serving to guide the lug 30 at the opposite end of the flange into position, and to draw the ends of the flange toward each other. A small lug 34 is preferably provided on a line with the bottom of the channel, to engage the first lug 30 and prevent the same from slipping away from the wall 32 of the slot.

For securing the lugs 30 together and to the rim, and thus holding the split tire-retaining flange in position upon the rim, I prefer to use the improved locking clamp shown in Figs. 1, 3 and 5, and in greater detail in Figs. 6 to 11. The same clamp is illustrated in all these figures, although in Figs. 6 to 11 it is shown in connection with a rim permanently mounted upon the felly of a wooden wheel. Such mounting of the rim, however, in no way modifies the operation of the locking clamp.

Referring particularly to Figs. 8 and 10, it will be seen that the lugs 30 are provided with recesses 35 and 36 which combine to provide a recess for the reception of the T-head 37 of the T-headed bolt 38 which forms a part of the locking clamp. The stem 39 of this bolt projects between the hooked portions 40 of the lugs 30, which extend below the head 37 of the bolt. The end of the stem of the bolt projects through an opening 41 in a cap 42 in which are received the lugs 30. It will be noted that the outer walls 43 of the lugs 30 are inclined, the inner end walls 44 of the cap 42 being similarly inclined so that when the cap is screwed up it will wedge the lugs 30 together and thus draw the split flange tight upon its seat. The cap is drawn into position and this wedging action secured by means of a nut 45 which screws on the stem of the bolt 38 and engages the cap 42. Figs. 9 and 10 show this nut screwed up, the cap being forced into wedging engagement with the lugs 30 and the ends of the split flange 21 being drawn into contact. The general form of this locking device is illustrated in the patent to Bryant above referred to. My present improvement consists in securing all the parts of this locking device or clamp together so as to prevent the loss of any part. I accomplish this by swiveling the nut 45 to the cap 42 and by connecting the T-headed bolt 38 to the cap in such a way as to permit a limited reciprocating movement of the bolt with respect to the cap. In the specific form of my invention illustrated, the nut is secured to the cap by forming a neck 46 on the nut, this neck terminating in a flange 47. This neck and flange are received in a sleeve 48 projecting from the cap, the edge 49 of the sleeve being flanged or crimped over to engage the flange 47 of the nut. The nut may thus swivel upon the cap but the two parts cannot be separated. For securing the bolt 38 to the cap, the stem of the bolt is preferably provided with a longitudinal slot 50 which receives the end of a screw 51 which is inserted in a screw-threaded hole in the cap.

To assemble the parts, the nut 45 is inserted in the sleeve 48, the edge of which is then crimped over as above described. The stem of the bolt 38 is then screwed into the nut 45 for a short distance, and the screw 51 inserted. The screw limits the movement of the bolt 38 and prevents the same from being entirely unscrewed from the nut 45. To apply the locking clamp to the rim, the T-headed bolt is screwed out to the position shown in Figs. 6, 7 and 8, when the T-head of the bolt can be inserted into the recesses 35, 36, as shown in Fig. 8. The nut 45 is then screwed up, drawing the lugs 30 down and cap 42 up, and wedging the ends of the split flange together, the parts finally assuming the position shown in Figs. 9 and 10. Fig. 11 also shows the clamp screwed up as in Figs. 9 and 10.

The outer wall of the cap 42 is preferably extended upward, as indicated by the numeral 52 in Fig. 6, this extension serving to fill the gap in the outer wall of the channel formed by the notch in the rim, and thus give the rim a smooth appearance and prevent the entrance of dirt into the joint. This is clearly illustrated in Fig. 1.

As is shown in Figs. 6 and 11, the clamp is preferably provided with a triangular lug 53, which, when the clamp is screwed up, enters the space between the lug 30 and the beveled wall 33 of the slot in the rim. This lug thus fills this space as shown in Fig. 11, and transmits the tensional stresses in the split flange from the lug 30 directly to the rim base.

The swiveling of the nut 45 to the cap 42 not only prevents these parts from becoming separated, but also permits the nut 45 to act as a means for drawing the cap 42 away from the lugs 30 when the flange is to be removed from the rim. Such drawing action is usually amply sufficient to break any rust which may have formed between the cap and the lugs 30. It is usually advisable, however, to form in the extension 52 a small notch 54 in which the end of a tool may be inserted for the purpose of prying the cap 42 away from the lugs 30 in case it has rusted fast thereto.

It will be seen from the foregoing description of my invention that I have provided a rim having a removable flange, which may be locked firmly and solidly in position.

The lock is neat in appearance, very strong, and may be very readily manipulated, as all of the parts of the same are secured together to form the unit shown in Fig. 6. I have also provided a rim structure in which the tire-carrying rim may be detachably but firmly secured upon the felly member of a wheel, the securing means permitting of the ready removal and replacement of the rim.

While I have shown in the drawings and specifically described a certain preferred embodiment of my invention, it is to be understood that I do not intend to limit myself to the details illustrated, but that my invention is capable of modification and of being embodied in other structures.

Having thus described my invention I claim:

1. A vehicle wheel rim comprising a rim base, a split detachable flange having lugs projecting from the ends thereof and a locking clamp for securing said ends together, said clamp comprising a clamping member adapted to engage said lugs, a bolt having a head engaging the ends of the flange, and a stem extending through an opening in said clamping member, and a nut screwing on said stem, said nut, clamping member and bolt being permanently secured together.

2. A vehicle wheel rim comprising a rim base, a detachable transversely split flange mounted thereon, and means for clamping the ends of said split flange together, said means comprising a clamping member, a bolt engaging the ends of the flange, having a stem passing through an opening in said clamping member, a nut swiveled to said clamping member and engaging said stem, and means for preventing said bolt from becoming entirely unscrewed from said nut.

3. A securing device for a split tire retaining flange, comprising lugs depending from said flange adjacent to the ends thereof, extensions formed on said lugs, a cap member having an opening therethrough adapted to inclose and embrace said lugs, a bolt having its head adapted to engage said extensions and its stem adapted to project outwardly through said opening in said cap, and a nut swiveled to said cap and adapted to be turned upon said bolt to force said cap and lugs into snug engagement.

4. A securing device for a split tire retaining flange, comprising lugs depending from said flange adjacent to the ends thereof, extensions formed on said lugs, a cap member having an opening therethrough adapted to inclose and embrace said lugs, a bolt having its head adapted to engage said extensions and its stem adapted to project outwardly through said opening in said cap, and a nut swiveled to said cap and adapted to be turned upon said bolt to force said cap and lugs into snug engagement, and means for limiting the movement of said bolt with relation to said cap.

5. A securing device for a split tire retaining flange, comprising lugs depending from said flange adjacent to the ends thereof, extensions formed on said lugs, a cap member having an opening therethrough adapted to inclose and embrace said lugs, a bolt having its head adapted to engage said extensions and its stem adapted to project outwardly through said opening in said cap, and a nut swiveled to said cap and adapted to be turned upon said bolt to force said cap and lugs into snug engagement, said bolt having a longitudinal slot formed therein throughout a part of its length, and a screw carried by said cap, the end of said screw entering said slot.

6. A locking device for engaging the ends of a split tire retaining flange provided with recessed lugs, comprising a cup-shaped cap member having a hole through the bottom thereof, a nut swiveled to said cap member in alinement with said hole, a T-headed bolt passing through said hole and screwing into said nut, and means for limiting the movement of said T-headed bolt with relation to said cap whereby it is prevented from being entirely unscrewed from said nut.

7. A locking device for engaging the ends of a split tire retaining flange provided with recessed lugs, comprising a cup-shaped cap member having a hole through the bottom thereof, a nut swiveled to said cap member in alinement with said hole, a T-headed bolt passing through said hole and screwing into said nut, the stem of said bolt being longitudinally slotted for a portion of its length, and a projection carried by said cap and entering the slot in the bolt, the engagement between said projection and slot preventing rotary movement of said bolt and limiting the longitudinal movement thereof.

8. A vehicle wheel rim comprising a rim base having a channel formed at one side thereof, a transversely split tire retaining flange having a portion adapted to seat in said channel, the bottom of said channel being recessed at one point, lugs depending from the ends of said split flange projecting through the recess in the bottom of said channel, said lugs having inclined outer end walls and recessed adjacent walls, and a locking clamp for securing said split flange in position, said clamp comprising a cup-shaped cap member having inclined end walls adapted to engage the inclined end walls of said lugs, said cap member having a hole in the bottom thereof and a nut permanently swiveled thereto in line with said hole, and a T-headed bolt the head of which is received in the recesses in said lugs, the stem of said bolt passing through the hole in said cap member and being engaged by said nut, the stem of said bolt having a longitudinal slot therein extending throughout a part of the length of said stem, and a screw carried by said cap member, the end of said screw entering said slot and holding said bolt against rotary movement and limiting the longitudinal movement of said bolt with relation to the cap member.

9. A vehicle wheel rim comprising a rim base having a channel formed at one side thereof, and a transversely split reversible tire-retaining flange, said flange having a base adapted to be received in said channel, said flange having a clencher groove formed in one side thereof, the other side thereof being formed to engage a straight-sided tire and having a groove formed therein above the base of the flange, but below that portion of the flange adapted to engage the side of the tire.

10. A transversely split reversible tire-retaining flange for vehicle wheel rims comprising a base and a tire-retaining portion, said portion having a clencher groove formed in one side thereof, the other side being formed to engage a straight-sided tire and having a groove formed therein above the base of the flange but below that portion of the flange adapted to engage the side of the tire, said last-named groove being independent of portions of said flange adapted to coact with said rim.

11. A tire-carrying rim for demountable rim structures having an annular depression rolled therein, and an endless metallic hoop shrunk in position over said recess to provide a substantially flush tire-seating surface, the edges of said hoop being let into shallow recesses in the tire-seating surface of the rim.

12. A tire-carrying rim for demountable rim structures comprising a rim base having an annular depression rolled therein near one edge thereof, the portion of said rim base at the side of said depression being carried outward and upward to form the bottom and outer wall of a channel, and a metallic hoop of angular cross-section shrunk upon said rim base over the depression therein, one leg of said hoop covering said depression and forming a flush tire-seating surface, the other leg of said hoop forming the inner wall of said channel, and a tire-retaining flange having a portion adapted to be seated in said channel.

13. A tire-carrying rim for demountable rim structures, having an annular depression rolled therein, and a metal hoop of angular cross-section extending from side to side of said depression and providing a substantially flush seating surface for the tire.

14. A tire-carrying rim for demountable rim structures having an annular depression rolled therein, an endless metallic hoop of angular cross-section shrunk in position over said depression, one leg of said hoop covering said depression and forming a flush tire-seating surface, the other leg of said hoop forming the inner wall of a flange-seating channel partially formed by an extension of said rim, and a tire-retaining flange having a portion adapted to seat in said channel.

15. A tire-carrying rim for demountable rim structures comprising a rim base having annular depressions rolled therein near the edges thereof, and metal hoops bridging said depressions and providing substantially flush tire-seating surfaces, the portion of said rim base at one side of one of said depressions being carried outward and upward to form the bottom and outer walls of a channel, the other wall of said channel being formed by an inwardly turned leg upon the hoop bridging said depression, and a tire-retaining flange having a portion adapted to be seated in said channel.

16. A tire-carrying rim for demountable rim structures having annular depressions rolled therein adjacent the edges thereof, said depressions serving as engaging means to retain the rim in place upon a vehicle wheel, and endless metallic hoops therefor providing a substantially equal seating surface for the tire, one of said hoops extending from side to side on one of said depressions.

17. A tire-carrying rim for demountable rim structures comprising a rim base having an annular depression rolled therein near one edge thereof, said depression forming a portion of an annular flange retaining channel, an endless metallic hoop having a portion completing said channel and extending across to the opposite side of said depression to form a flush seating surface for the tire, and a tire-retaining flange having a portion seating in said channel.

JAMES H. WAGENHORST.

Witnesses:
 SEWARD DAVIS,
 EDMUND QUINCY MOSES.